W. E. DAWKINS & A. W. LIPSCOMB.
AUTOMATIC MINE TRACK SWITCH.
APPLICATION FILED JULY 24, 1916.
1,224,282.
Patented May 1, 1917.
2 SHEETS—SHEET 2.
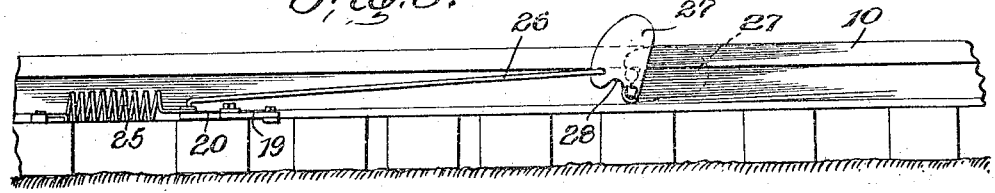
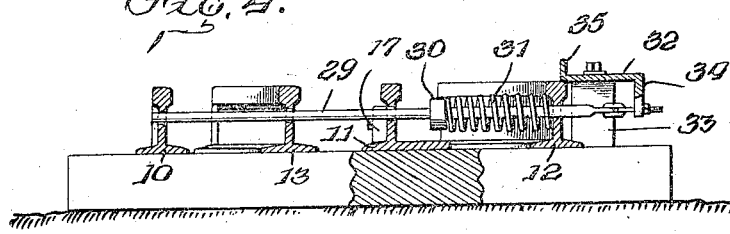
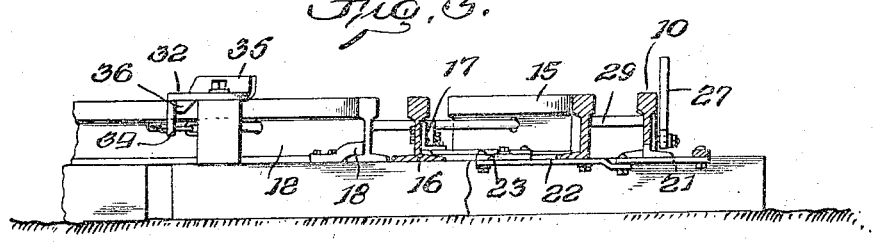
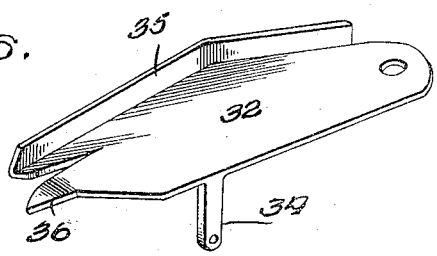
Inventors
W. E. Dawkins and
A. W. Lipscomb
By
Attorneys.

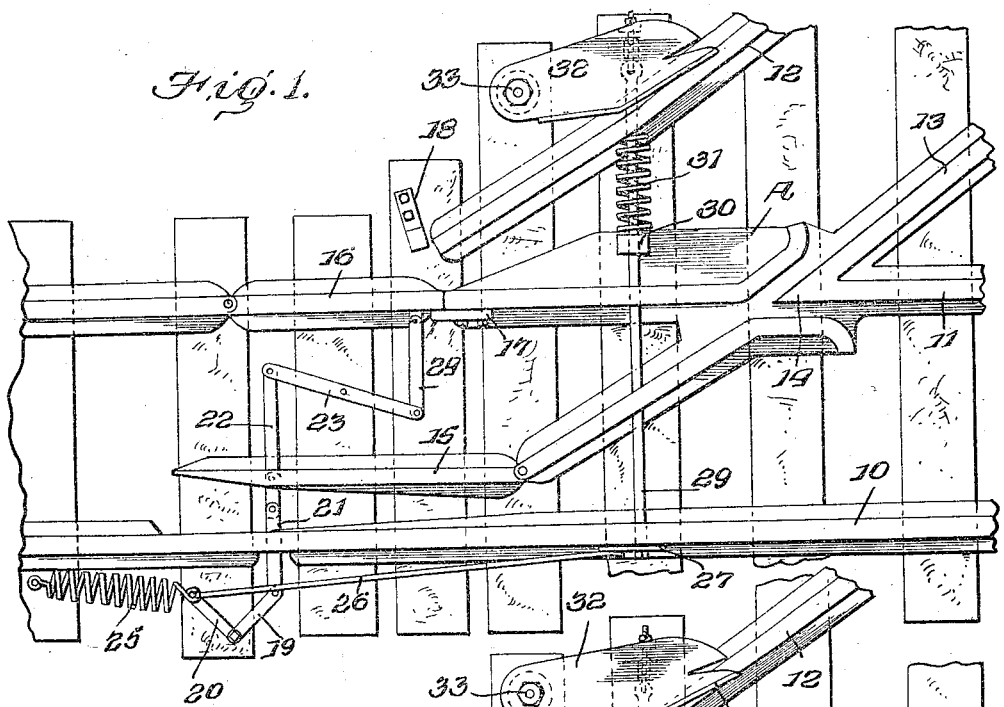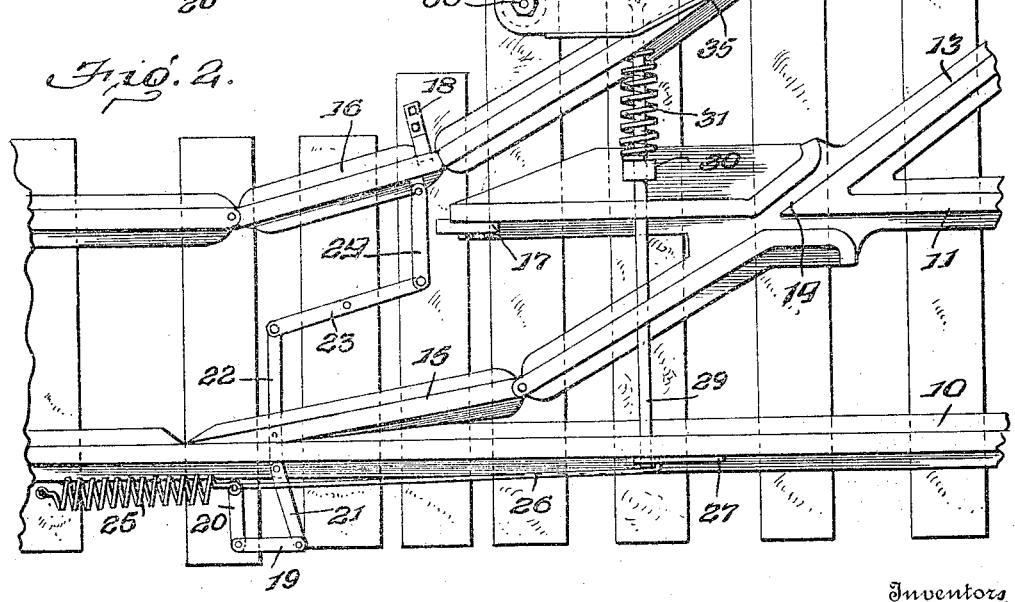

UNITED STATES PATENT OFFICE.

WILL E. DAWKINS AND ARTHUR W. LIPSCOMB, OF BREESE, ILLINOIS.

AUTOMATIC MINE-TRACK SWITCH.

1,224,282.  Specification of Letters Patent.  Patented May 1, 1917.

Application filed July 24, 1916. Serial No. 111,013.

*To all whom it may concern:*

Be it known that we, WILL E. DAWKINS and ARTHUR W. LIPSCOMB, citizens of the United States, residing at Breese, in the county of Clinton and State of Illinois, have invented certain new and useful Improvements in Automatic Mine-Track Switches, of which the following is a specification.

This invention contemplates an improved mine track switch and has as its primary object to provide an arrangement wherein the mine cars will be automatically switched from the main track to the switch track, thus eliminating the necessity for a switchman.

The invention has as a further object to provide an arrangement wherein a car upon the main track after passing the switch will throw the switch for directing a succeeding car onto the switch track and wherein the said last mentioned car upon entering upon the switch track will throw a trip lever to permit automatic closing of the switch to leave the main track clear.

The invention has as a still further object to provide a switch lever operable by a car passing over the main track for opening the switch and wherein a spring pressed locking rod will be provided for automatic engagement with the said lever for locking the switch open to direct a succeeding car onto the switch track.

And a still further object of the invention is to provide an arrangement wherein the switch will be yieldably held in closed position and wherein the trip previously referred to will be connected to the locking rod for actuating the rod to release the switch lever and permit the automatic movement of the switch to closed position.

Other and incidental objects will appear as the description proceeds and in the drawings wherein we have illustrated the preferred embodiment of the invention and wherein similar reference characters designate corresponding parts throughout the several views:

Figure 1 is a plan view showing the switch closed with the main track open,

Fig. 2 is a similar view showing the switch open with the main track closed,

Fig. 3 is a side elevation showing the switch lever operable for opening the switch, Fig. 4 is a transverse sectional view showing the mounting of the locking rod for the switch lever and the trip lever for actuating the said rod, Fig. 5 is a similar view more particularly showing the mounting of the trip lever and the arrangement of the locking rod to coöperate with the switch lever, and Fig. 6 is a detail perspective view showing the trip lever detached.

In carrying out the invention, the main track having rails 10 and 11 is intersected by a switch track having rails 12 and 13 respectively, the usual frog 14 being arranged at the junction of the rails 11 and 13. Pivotally connected to the adjacent terminal of the rail 13 of the switch track is a switch point 15 movable to seat against the rail 10 and arranged to coöperate with the switch point 15, is a switch point 16 which is formed by a section of the rail 11 of the main track. The switch point 16 is pivotally connected at one end with the adjacent terminal of the rail 11 with its free end arranged toward the pivot point of the switch point 15 and movable from normal position with the said switch point closing the gap in the rail and engaged by a stop 17 carried by the adjacent terminal of the rail 11 to a position coöperating with the adjacent end of the rail 12 of the switch track as particularly shown in Fig. 2, to be engaged by a stop 18.

Pivoted upon a tie or other suitable support adjacent the free end of the switch point 15, is a bell crank lever having arms 19 and 20. Pivoted at one end to the arm 19 of the said lever, is a link 21, the opposite end of which is pivotally connected to one end of a link 22 attached to the free extremity of the switch point 15. The opposite end of the link 22 is connected to one end of a rock lever 23 pivoted upon a tie or other suitable support between the rails 10 and 11. Pivotally connected to the opposite end of the lever 23, is a link 24, the outer extremity of which is pivotally connected to the free extremity of the switch point 16. Attached to the arm 20 of the bell crank lever is a suitable spring 25 and pivotally connected at one end to the said arm is a rod or link 26, the opposite end of which is pivotally connected to a switch lever 29 arranged upon the main track in inward spaced relation to the switch points 15 and 16 and pivotally mounted upon the outer side of the rail 10 of the said track.

The switch lever 27 is best seen in Fig. 3 of the drawings and it will be noted that the said lever is formed with a curved upper edge for engagement with the wheels of a car passing over the main track and is further provided adjacent the inner extremity thereof with a notch 28. The purpose of this notch will presently appear.

At this point, it is to be observed that the spring 25 will act upon the bell crank lever 20 to normally hold the switch closed and the main track open for the passage of a car thereover with the switch point 15 spaced from the rail 10 and with the switch point 16 closing the gap in the rail 11 of the said track. Also, the spring 25 will act upon the switch lever 27 to normally hold the said lever in position projecting upwardly above the rail 10 of the main track for engagement with the wheels of a car passing over the said track.

Slidably mounted through the webs of the rails of the main track and the switch track is a transversely arranged locking rod or element 29 which, at its inner extremity, terminates above the pivot point of the switch lever 27 and at its outer extremity, projects laterally beyond the rail 12 of the switch track. Mounted upon the said rod, is a collar 30 and interposed between the said collar and the rail 12 to surround the rod is a helical spring 31 normally acting upon the collar 30 to urge the locking rod to active position projecting at its inner extremity through the rail 10 of the main track to coöperate with the switch lever 27. However, it will be observed that the said switch lever when in normal position, as shown in Fig. 3 of the drawings, provides a stop for the said locking rod, acting to hold the said rod in inactive position against the tension of the said spring.

Associated with the outer extremity of the locking rod 29 is a trip lever 32 shown in detail in Fig. 6 of the drawings. This lever may be formed of sheet metal if desired and is pivotally mounted upon a post 33 arranged upon a tie or other suitable support adjacent the outer end of the rod 29. Upon its outer edge, the lever 32 is formed with a downwardly extending arm 34 which, as particularly seen in Fig. 1 of the drawings, receives a suitable link pivotally connecting the trip lever with the locking rod. The free extremity of the trip lever is arranged to project over the tread of the rail 12 of the switch track and upon its inner edge, the said lever is formed with an upwardly extending flange 35 for engagement with the wheels of a car passing over the said track and acting to throw the said lever outwardly upon its pivot and retract the locking rod 39 against the tension of the spring 31. The inward pivotal movement of the trip lever to extend over the rail 12 is defined by the stop lug 26 struck from the free end of the said lever to extend downwardly therefrom for engagement with the outer side of the said rail.

Since the switch points 15 and 16 will, as previously described, normally be arranged, as shown in Fig. 1, with the main track open, a car may then pass in the direction of the arrow over the said track. Such car, upon reaching the switch lever 27 will engage therewith to rock the lever upon its pivot to the position shown in dotted lines in Fig. 3 of the drawings when the notch 28 of the said lever will be moved opposite the inner end of the locking rod 29 to receive the said rod under the influence of the spring 31 associated therewith. The purpose of this notch therefore becomes apparent. When the switch lever is thus depressed, the bell crank lever connected thereto will be moved against the tension of the spring 25 to shift the switch point 15 inwardly to contact with the rail 10 of the main track, and, through the medium of the rock lever 23, shift the switch point 16 outwardly to coöperate with the adjacent end of the rail 12. The switch will thus be thrown, as shown in Fig. 2 of the drawings, to open the switch track for the passage of a succeeding car thereover with the main track closed, and attention is directed to the fact that the rod 29 will automatically act, upon the depression of the switch lever 27 to lock the switch in such position. The succeeding car upon the main track will consequently be directed over the switch track and upon reaching the trip lever 32, said car will contact with the flange 35 thereof to rock the said lever outwardly upon its pivot and withdraw the locking rod 29, against the tension of the spring 31, from engagement with the switch lever 27. Upon the release of the switch lever, the spring 25 will act to again throw the switch to the position shown in Fig. 1 with the main track open for the passage of a car thereover and with the switch track closed.

It will therefore be seen that we provide an arrangement wherein the switch will be automatically operated by the passage of a car over the main track to throw the switch for the passage of a succeeding car over the switch track and wherein the switch will, upon the passage of such succeeding car over the switch track be automatically operated to throw the switch for again opening the main track. The necessity for a switchman is thus eliminated.

Having thus described our invention, what we claim and desire to secure by Letters Patent is:

1. In switch mechanism, a main track, a switch track, pivoted switch throwing means normally projecting upwardly from the main track and engageable by a car passing thereon for rocking the said means to open the switch, means operable to project above said switch throwing means for locking the switch in the open position thereof, and means operable by a car passing over the switch track for releasing the said locking means.

2. In switch mechanism, a main track, a switch track, coacting switch points, pivoted switch throwing means engageable by a car passing over the main track for rocking the said means and shifting the switch points in opposite directions to open the switch, and means arranged for engagement with the said switch throwing means for locking the switch in open position.

3. In switch mechanism, a main track, a switch track, coacting switch points, pivoted switch throwing means engageable by a car passing over the main track for rocking the said means and shifting the said switch points to open the switch, and means mounted upon the rails of the main track and shiftable transversely with respect thereto for engagement with the said switch throwing means for locking the switch in open position.

4. In switch mechanism, a main track, a switch lever mounted to rock at one side of the main track and engageable by a car passing over the main track, means urged into the path of rocking movement of the said lever for locking the lever in the open position of the switch, and means operable by a car passing over the switch track for releasing the said locking means to free the said lever.

5. In switch mechanism, a main track, a switch track, switch throwing means operable by a car passing over the main track to open the switch, and means urged to lock the said switch throwing means in the open position of the switch with the said switch throwing means normally providing a stop for the said locking means to hold the locking means in inactive position.

6. In switch mechanism, a main track, a switch track, a switch lever operable by a car passing over the main track to open the switch, and means urged to lock the said lever in the open position of the switch with the said lever normally providing a stop holding the said locking means in inactive position.

7. In switch mechanism a main track, a switch track, switch throwing means, and means for locking the said switch throwing means with the said switch throwing means normally providing a stop therefor and operable by a car passing over the main track to open the switch and free the said locking means for engagement with the said switch throwing means to lock the said switch throwing means in the open position of the switch.

8. In switch mechanism, a main track, a switch track, switch throwing means operable by a car passing over the main track to open the switch, and a locking rod urged to engage the said means for locking the said means in the open position of the switch.

9. In switch mechanism, a main track, a switch track, switch throwing means operable by a car passing over the main track to open the switch, a locking rod urged to engage the said means for locking the said means in the open position of the switch, and a trip lever associated with the said rod and operable by a car passing over the switch track for retracting the said rod and releasing the said means.

10. In switch mechanism, a main track, a switch track, a switch throwing lever operable by a car passing over the main track to open the switch, a locking rod urged to active position for locking the said switch lever in the open position of the switch with the said lever normally providing a stop for the said rod and movable to free the rod upon the actuation of the said lever, and a trip lever associated with the rod and operable by a car upon the switch track for retracting the rod and freeing the switch throwing lever.

11. In switch mechanism, a main track, a switch track, switch throwing means operable by a car passing over the main track for opening the switch, means arranged to engage with said switch throwing means for locking the switch in open position, a pivoted trip lever mounted for movement laterally with respect to a rail of the switch track, a lug carried by the free extremity of said lever and disposed for engagement with the outer side of the said switch track rail for limiting the lever in its inward movement, an arm depending from the lever and connected with said locking means, and a flange upstanding from the lever and adapted for engagement by a car upon the switch track for shifting the said lever outwardly to actuate the said locking means and release the said switch throwing means.

12. In switch mechanism, a main track, a switch track, switch points normally urged to close the switch, and means automatically operable upon the passage of a car over the main track for opening the switch and locking the said switch in such position.

In testimony whereof we affix our signatures.

WILL E. DAWKINS. [L. S.]
ARTHUR W. LIPSCOMB. [L. S.]

Copies of this patent may be obtained for five cents each, by addressing the "Commissioner of Patents, Washington, D. C."